United States Patent
Suryanarayana et al.

(10) Patent No.: US 11,995,188 B2
(45) Date of Patent: May 28, 2024

(54) METHOD FOR FASTER AND SAFE DATA BACKUP USING GPT REMOTE ACCESS BOOT SIGNATURES TO SECURELY EXPOSE GPT PARTITIONS TO CLOUD DURING OS CRASH

(71) Applicant: Dell Products L.P., Round Rock, TX (US)

(72) Inventors: Shekar Babu Suryanarayana, Bangalore (IN); Venkata Rama Krishna Rao Atta, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 283 days.

(21) Appl. No.: 16/521,767

(22) Filed: Jul. 25, 2019

(65) Prior Publication Data
US 2021/0026965 A1 Jan. 28, 2021

(51) Int. Cl.
| | |
|---|---|
| *G06F 21/57* | (2013.01) |
| *G06F 9/4401* | (2018.01) |
| *G06F 11/14* | (2006.01) |
| *G06F 13/20* | (2006.01) |
| *H04L 9/40* | (2022.01) |

(52) U.S. Cl.
CPC .......... *G06F 21/572* (2013.01); *G06F 9/4406* (2013.01); *G06F 11/1464* (2013.01); *G06F 13/20* (2013.01); *H04L 63/08* (2013.01); *G06F 2201/84* (2013.01); *G06F 2221/034* (2013.01)

(58) Field of Classification Search
CPC .. G06F 21/572; G06F 9/4406; G06F 11/1464; G06F 13/20; G06F 2201/84; G06F 2221/034; H04L 63/08

USPC .......................................................... 726/6
See application file for complete search history.

(56) References Cited

U.S. PATENT DOCUMENTS

| | | | | |
|---|---|---|---|---|
| 7,937,545 B1* | 5/2011 | Wu | ...................... | G06F 11/1448 709/219 |
| 8,225,109 B1* | 7/2012 | Kalligudd | ............. | G06F 11/1464 713/193 |
| 2013/0205063 A1* | 8/2013 | Zhang | ................. | G06F 11/1464 711/E12.008 |
| 2013/0212581 A1* | 8/2013 | Edwards | ................ | G06F 21/562 718/1 |
| 2014/0173171 A1* | 6/2014 | Chen | ..................... | G06F 9/4406 711/102 |
| 2016/0306961 A1* | 10/2016 | Suryanarayana | ....... | G06F 21/44 |

(Continued)

OTHER PUBLICATIONS

McIntosh, "Large Scale Behavioral Analysis of Ransomware Attacks", 2018, ICONIP, pp. 217-229 (Year: 2018).*

*Primary Examiner* — Piotr Poltorak
*Assistant Examiner* — Gregory A Lane
(74) *Attorney, Agent, or Firm* — Jackson Walker L.L.P.

(57) ABSTRACT

An information handling system may include a processor, a memory coupled to the processor, a storage resource, and a basic input/output system (BIOS). The BIOS may be configured to, while the information handling system is in a pre-boot environment and prior to initialization of an operating system of the information handling system: establish a communication session with a remote information handling system; and in response to authentication of the communication session, transmit data to the remote information handling system that is operable to expose a partition of the storage resource to the remote information handling system.

14 Claims, 4 Drawing Sheets

(56) References Cited

U.S. PATENT DOCUMENTS

| | | | |
|---|---|---|---|
| 2017/0344420 A1* | 11/2017 | Seibert | G06F 11/079 |
| 2020/0250119 A1* | 8/2020 | Cannata | G06F 13/20 |
| 2020/0301616 A1* | 9/2020 | Ciocari | G06F 3/0664 |

* cited by examiner

METHOD FOR FASTER AND SAFE DATA BACKUP USING GPT REMOTE ACCESS BOOT SIGNATURES TO SECURELY EXPOSE GPT PARTITIONS TO CLOUD DURING OS CRASH

TECHNICAL FIELD

The present disclosure relates in general to information handling systems, and more particularly to systems and methods for remote access to storage resources of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As described in further detail below, there are various deficiencies in current solutions for data backup. For example, currently no solutions are available for making a data backup of a storage resource (e.g., a hard disk) from a pre-boot environment (e.g., when an operating system (OS) is crashed or otherwise inoperable). Although OS-based solutions are available to take such a backup (e.g., an incremental backup) of a storage resource while an OS is running, these solutions do not operate from a pre-boot environment such as a Unified Extensible Firmware Interface (UEFI) environment. Other existing tools typically operate by booting an information handling system into a recovery OS to allow backup of a file system, but these also are incapable of operating from a pre-boot environment.

One difficulty is that in a pre-boot environment, advanced file systems like NTFS, EXT3, EXT4, etc., are typically not supported. Thus without booting into an OS, the pre-boot environment can typically only identify a partition (e.g., a Globally Unique Identifier Partition Table (GPT) partition) but cannot mount an advanced file system. Accordingly, recovering the disk (e.g., to make a data backup) has not been possible without booting into an OS of some kind, such as a recovery OS.

Accordingly, some embodiments of this disclosure are operable to expose a disk partition (e.g., a GPT partition) over a network connection to a remote information handling system that is capable of recognizing the raw partition data and mounting a file system over it. This may be accomplished in some embodiments via the use of a pre-boot driver operable to recognize the disk partitions and dynamically bridge the raw partitions over a pre-boot network connection. Further, while existing tools typically recognize a GPT partition and expose it to a recovery OS without any security measures, embodiments of the present disclosure are able to dynamically support GPT boot signatures to securely expose the partitions for authorized access.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with remote access to storage resources of information handling systems may be reduced or eliminated.

In accordance with embodiments of the present disclosure, an information handling system may include a processor, a memory coupled to the processor, a storage resource, and a basic input/output system (BIOS). The BIOS may be configured to, while the information handling system is in a pre-boot environment and prior to initialization of an operating system of the information handling system: establish a communication session with a remote information handling system; and in response to authentication of the communication session, transmit data to the remote information handling system that is operable to expose a partition of the storage resource to the remote information handling system.

In accordance with these and other embodiments of the present disclosure, a method may include, while an information handling system is in a pre-boot environment and prior to initialization of an operating system of the information handling system: a basic input/output system (BIOS) of the information handling system establishing a communication session with a remote information handling system. The method may further include, in response to authentication of the communication session, the BIOS transmitting data to the remote information handling system that is operable to expose a partition of a storage resource of the information handling system to the remote information handling system.

In accordance with these and other embodiments of the present disclosure, an article of manufacture may include a non-transitory, computer-readable medium having computer-executable code thereon that is executable by a processor of an information handling system for, while the information handling system is in a pre-boot environment and prior to initialization of an operating system of the information handling system: a basic input/output system (BIOS) of the information handling system establishing a communication session with a remote information handling system; and in response to authentication of the communication session, the BIOS transmitting data to the remote information handling system that is operable to expose a partition of a storage resource of the information handling system to the remote information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
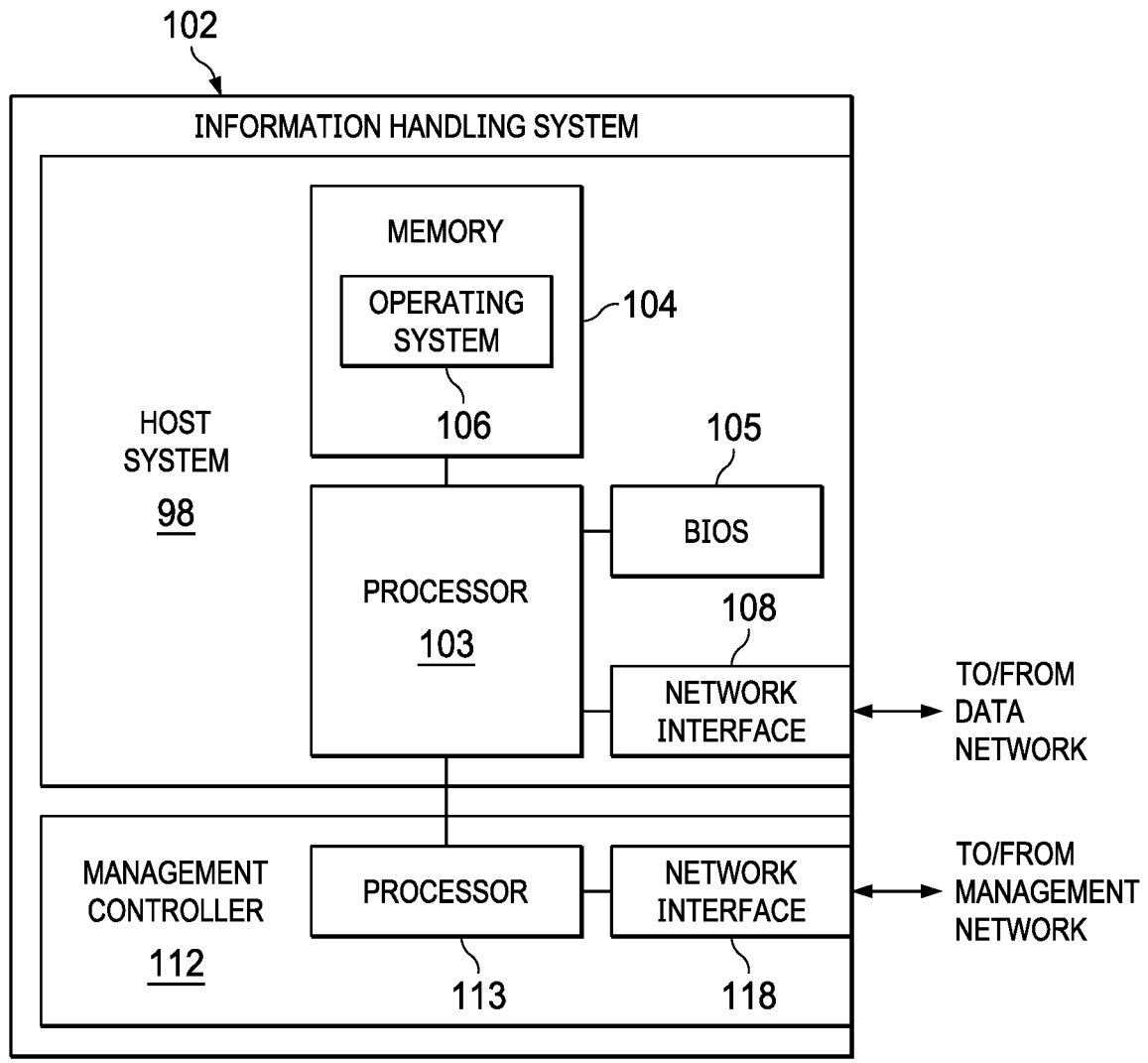
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

For the purposes of this disclosure, the term "partition" may broadly refer to a defined portion of a storage resource. Typically, such a partition may include a file system thereon that is configured to store data. Examples of partitions may include GPT partitions, Master Boot Record (MBR) partitions. Further, although they may not typically be considered partitions, within this disclosure Non-Volatile Memory Express (NVMe) namespaces also fall within the definition of that term. In some embodiments, a GPT partition may be created within such an NVMe namespace. Some embodiments of this disclosure work seamlessly with both traditional partitions (e.g., MBR and GPT partitions) as well as NVMe namespaces and partitions that may reside thereon.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As noted above, embodiments of this disclosure may be operable to expose a raw partition of a storage resource over a network connection while an information handling system is in a pre-boot environment (e.g., a UEFI environment executing before an OS has been loaded).

Figure 2:
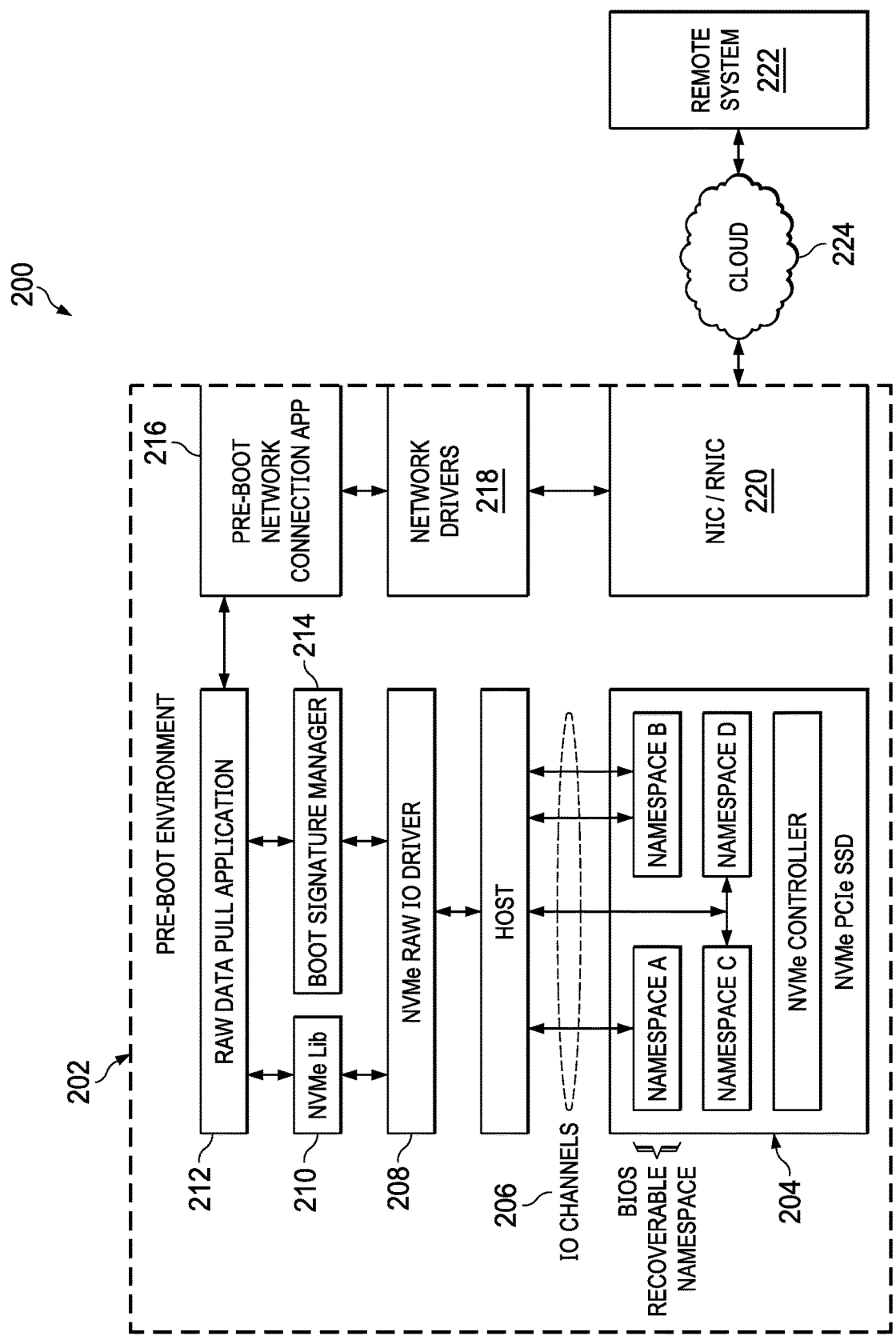
FIG. 2 illustrates a block diagram of an example architecture, in accordance with embodiments of the present disclosure.

Turning now to FIG. 2, a block diagram of an example architecture is shown. Various components within pre-boot environment 202 are operable to expose a partition via cloud 224 (e.g., the Internet) to a remote information handling system 222.

In particular, in the embodiment shown, a host system includes an NVMe PCIe solid-state drive 204, which may include a plurality of namespaces A, B, C, and D. These namespaces may be accessible to the host system via I/O channels 206. The host may then communicate with a remote information handling system as shown, via the use of an NVMe raw I/O driver 208, an NVMe library 210, a raw data pull application 212, and a pre-boot network connection app 216.

According to some embodiments, as discussed in more detail below, such functionality may be implemented via the use of (1) a boot signature generator module for managing secure access, (2) a pre-boot GPT-to-network driver for exposing partitions to a remote information handling system, and (3) a remote cloud network-to-GPT driver for allowing the remote information handling system to mount the partitions remotely.

1. A boot signature generator module may be implemented as part of a UEFI GPT partition manager and/or NVMe library 210. This module may generate master boot signatures and store such master boot signatures as part of a GPT and/or NVMe header. This module may further generate a partition-level and/or namespace-level secure signature and store it at an individual partition header or namespace label. The signatures may be generated using platform secure keys and a hash such that GPT headers are mapped to individual partitions and a partition table.
2. A pre-boot GPT-to-network driver may be implemented as code in a driver execution environment (DXE) that is operable to detect a storage resource and read the partitions thereon. A pre-boot DXE boot signature module may check for valid signatures from the cloud and enable access to local partitions. The DXE driver may scan the partition headers (discussed below) an expose them to a remote information handling system via the cloud. The DXE driver module may further read the partition data in hex or raw format and directly expose the data area to the remote information handling system.
3. Finally, a remote cloud network-to-GPT driver may, after gaining authorized access to a GPT partition, expose the GPT partition table based on trusted access sessions to a cloud file system mounting module. A cloud file system module may mount the appropriate file system (e.g., NTFS, EXT3, EXT4, etc.) over the remote GPT partition. Thus even if the local pre-boot environment does not have a file system driver capable of mounting the file system of a given partition, that file system may still be accessible remotely.

Once the remote information handling system mounts the file system, the entire partition or a portion thereof (e.g., a particular blob) may be read and a backup may be created. In some embodiments, the DXE driver may interface with a SCSI and/or PCIe block driver to read the partition data (e.g., via selecting specified offset ranges). The SCSI and/or PCIe block driver may be multiplexed in some embodiments such that reading specified offsets may be carried out in parallel with a host core of a UEFI engine. Thus once data is concurrently read from the various partitions, the data may be pooled into RAM and synced to the remote information handling system.

In some embodiments, boot secure signatures may be generated over an entire GPT partition area's hash to create a lock to index into the data area of the partition. For local access at boot time, secure access may be enabled at the boot device selection phase such that the host OS can access the primary partition and extended partitions after a one-time authorization.

As mentioned above, this disclosure has particular relevance in situations in which a host OS has crashed or become inoperable, and a user desires to back up data from a local storage resource to some remote information handling system. In some embodiments, once such an OS crash is detected, the GPT boot signature access may be restricted with a session, until a trusted session is established over a pre-boot network connection app 216 (e.g., Dell BIOSConnect) to a remote information handling system. Once the remote session is authenticated, the partition(s) may be exposed (for example, as raw partition data by NVMe raw I/O driver 208) to the remote information handling system via the use of network drivers 218 and network interface controller (NIC)/remote direct memory access (RDMA) NIC 220. Once such an authenticated session becomes invalid, the partition data may be blocked at the source such that no more data accesses can be made. In the context of NVMe namespaces, boot signature labels may be created for namespaces in NVMe SSDs by the NVMe library 210.

Boot signature manager module 214 may operate to unlock encrypted drives (e.g., drives encrypted with BitLocker or the like) as well as encryption keys such as self-encrypting drive (SED) keys. The boot signature manager module 214 may also be capable of retrieving partition data by locating an appropriate boot signature in an NVMe namespace or GPT partition which exactly locates the superblock and/or metadata of that namespace or partition. Using this data, I/O may be performed to access the data in a storage resource and export it securely via pre-boot network connection app 216.

Figure 3:
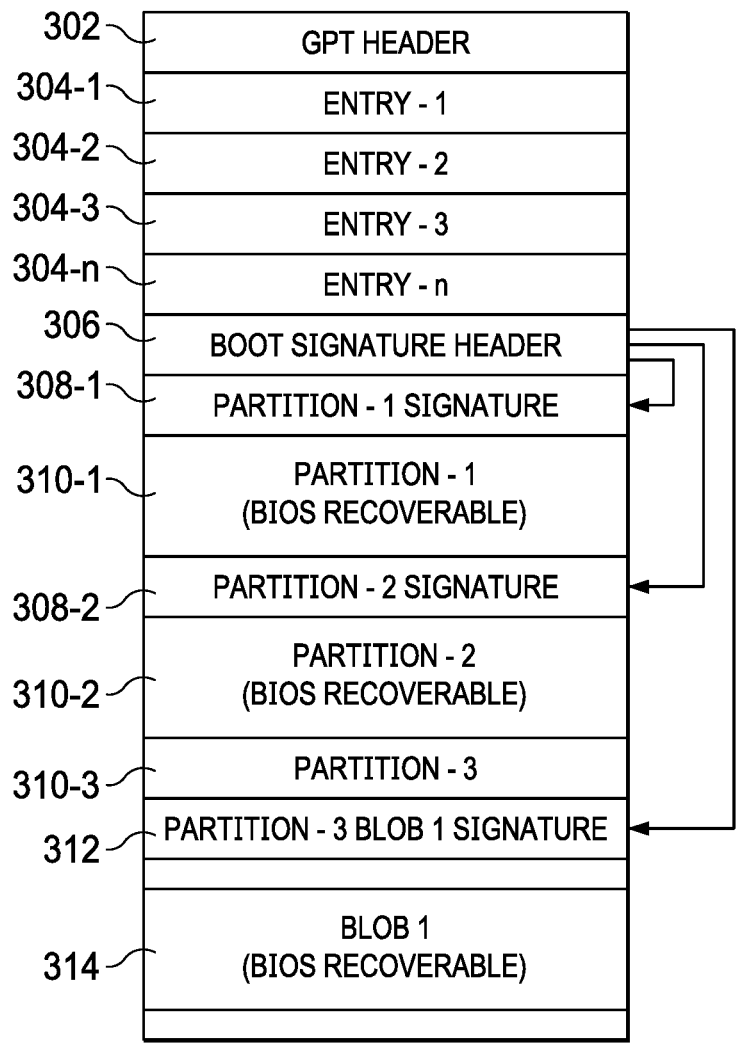
FIG. 3 illustrates an example partition layout, in accordance with embodiments of the present disclosure.

A GPT partition tool or a namespace library within a pre-boot environment may generate boot signatures which can point at and be used to recover the data from the corresponding partition or namespace (or in some embodiments, a particular blob of data within a partition, rather than the entire partition). FIG. 3 shows an example data structure including such boot signatures, allowing for retrieval of data from corresponding partitions, blobs, and/or namespaces.

As shown in FIG. 3, a GPT header 302 may include various entries 304. Boot signature header 306 may identify various signatures (e.g., partition signatures 308 and/or blob signature 312), which may allow for access to BIOS-recoverable partitions 310 and BIOS-recoverable blob 314.

In general, boot signatures may be used to lock a partition from being accessed, as the encryption key is required by access methods such as OS-level file system access or pre-boot level block access. The signatures may thus protect the partitions against unauthorized accesses.

Boot signatures may be used not only for locking and unlocking the partitions locally, but for remote cloud access as well in some embodiments. In particular, to mount a recoverable partition remotely, the boot signature authentication blob exchange may be used to locate the appropriate blob and unlock it for mounting as a remote file system.

In some embodiments, boot signatures may be located by a GPT entry in GPT-based partitions. For NVMe namespaces, an NVMe header (e.g., NVMe firmware interface table (FIT)) may locate the boot signatures. Boot signatures may include complete data regarding the partition start offset, size, checksum, security handlers, etc. A DXE raw block driver may be used to locate such boot signatures and access the corresponding data, making it available to a remote information handling system.

Figure 4:
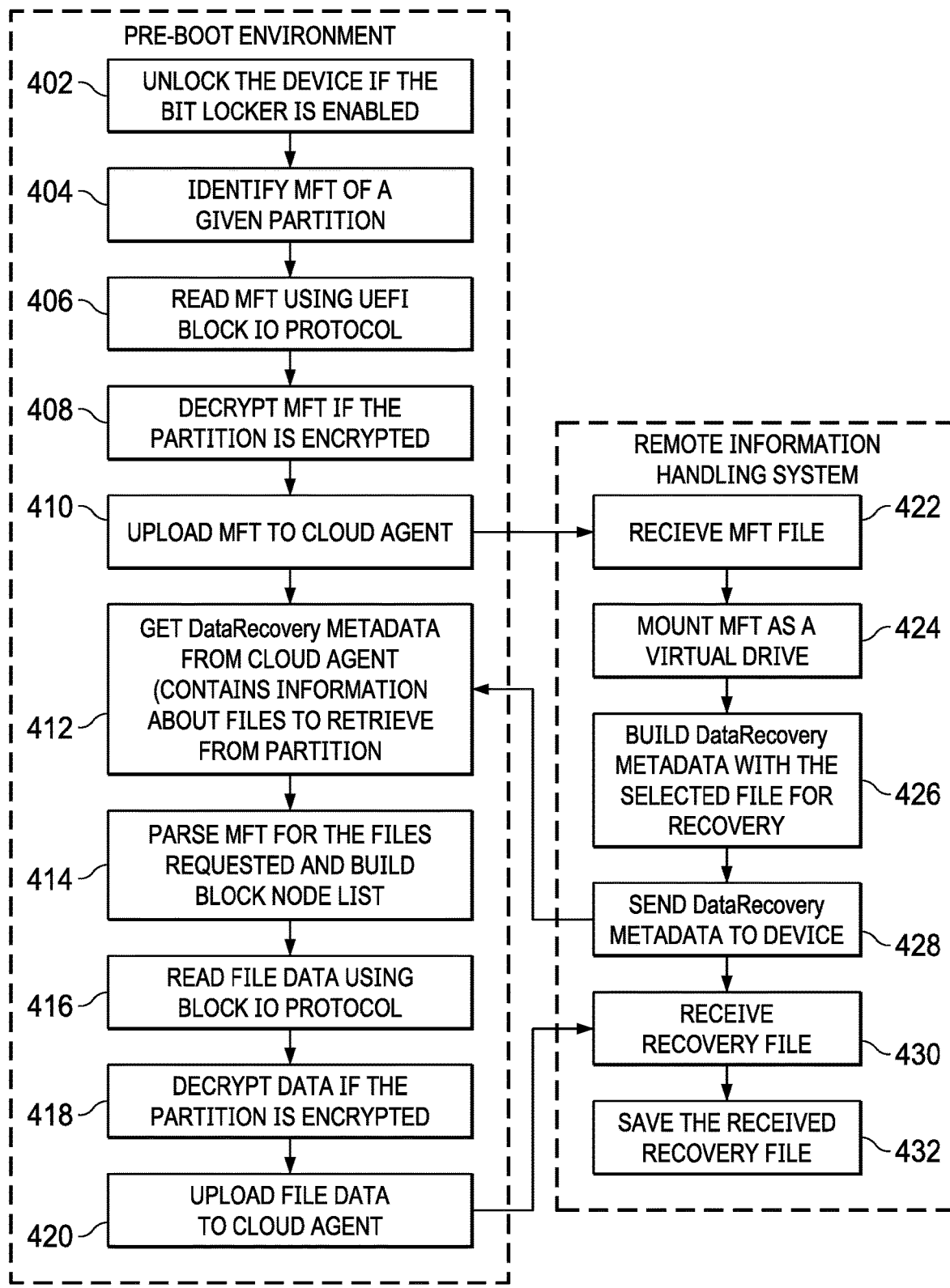
FIG. 4 illustrates an example flow diagram including example information handling systems, in accordance with embodiments of the present disclosure.

Turning now to FIG. 4, a flow diagram of an example method for exposing data of a storage device of a local information handling system to a remote information handling system is shown, in accordance with some embodiments of this disclosure.

At step 402, if the storage device is encrypted (e.g., with BitLocker or the like), it is first unlocked. Once the device is unlocked, at step 404, the master file table (MFT) of a given partition is identified. For example, in some embodiments, when a partition is created, such MFT information may be stored in a pre-boot environment variable such as a UEFI variable.

At step 406, the MFT may be read using a UEFI block I/O protocol. If the partition is encrypted, it may be decrypted at step 408. For example, decryption keys may be available in the pre-boot environment if such encryption is enabled.

At step 410, the MFT may be uploaded to the cloud (e.g., to the remote information handling system) via the use of a pre-boot network connection app.

The remote information handling system may then receive the MFT file at step 422, mounting it as a virtual drive at step 424. Data recovery metadata may then be built with the selected file at step 426. This metadata may then be sent back to the local information handling system (e.g., to the pre-boot environment thereof) at step 428.

At step 412, the local information handling system may receive the metadata, which may contain information about files to be retrieved from a partition). The MFT may be parsed locally for the requested files, and a block node list may be built at step 414.

File data for the requested files may be read (e.g., using a block I/O protocol) at step 416. At step 418, if the partition is encrypted, the file data may be decrypted as necessary. Finally, the decrypted file data may be uploaded to the remote information handling system at step 420.

The remote information handling system may then receive the file data at step 430 and save a copy of it at step 432.

One of ordinary skill in the art with the benefit of this disclosure will understand that the preferred initialization point for the method depicted in FIG. 4 and the order of the steps comprising that method may depend on the implementation chosen. In these and other embodiments, this method may be implemented as hardware, firmware, software, applications, functions, libraries, or other instructions. Further, although FIG. 4 discloses a particular number of steps to be taken with respect to the disclosed method, the method may be executed with greater or fewer steps than those depicted. The method may be implemented using any of the various components disclosed herein (such as the components of FIG. 1), and/or any other system operable to implement the method.

Accordingly, various embodiments of this disclosure may provide many benefits. For example, in some embodiments the use of boot signatures may allow for securely unlocking the storage resource, and secure I/O may be performed to remotely mount the partition to a cloud system. Further, in some embodiments, a GPT multi-offset block access module may perform parallel reads across different partition areas, bridging with a pre-boot network connection module for faster data recovery or backup during an OS crash. Further, faster pre-boot secure boot signatures may enable secure access to raw partition data by a remote cloud OS.

Although various possible advantages have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a processor;
   a memory coupled to the processor;
   a storage resource; and
   a basic input/output system (BIOS) configured to, while the information handling system is in a pre-boot environment and prior to initialization of an operating system of the information handling system:
      establish a communication session with a remote information handling system; and
      execute a pre-boot environment GPT-to-network driver configured to detect one or more partitions of the storage resource, scan partition headers of the one or more partitions, and in response to authentication of the communication session, transmit data to the remote information handling system that is operable to expose a partition of the storage resource as raw partition data to the remote information handling system, wherein the remote information handling system is configured to mount a file system of the partition based on the raw partition data and create a backup copy of the file system;
      wherein the pre-boot environment GPT-to-network driver is further configured to read a master file table (MFT) of the partition using a UEFI block input/output (I/O) protocol, transmit the MFT to the remote information handling system, receive metadata relating to at least one file from the remote information handling system based on the MFT, read the at least one file from the storage resource based on the metadata, and transmit the at least one file to the remote information handling system.

2. The information handling system of claim 1, wherein the partition is a Globally Unique Identifier Partition Table (GPT) partition.

3. The information handling system of claim 1, wherein the partition is an NVMe namespace.

4. The information handling system of claim 1, wherein the BIOS is a Unified Extensible Firmware Interface (UEFI) BIOS.

5. The information handling system of claim 1, wherein the partition is of a type selected from the group consisting of NTFS, EXT3, and EXT4.

6. The information handling system of claim 1, wherein the information handling system is configured to decrypt the partition based on the authentication.

7. A method comprising:
   while an information handling system is in a pre-boot environment and prior to initialization of an operating system of the information handling system:
      a basic input/output system (BIOS) of the information handling system establishing a communication session with a remote information handling system; and
      execute a pre-boot environment GPT-to-network driver configured to detect one or more partitions of the storage resource, scan partition headers of the one or more partitions, and in response to authentication of the communication session, the BIOS transmitting data to the remote information handling system that is operable to expose a partition of a storage resource of the information handling system as raw partition data to the remote information handling system, wherein the remote information handling system is configured to mount a file system of the partition based on the raw partition data and create a backup copy of the file system;
      wherein the pre-boot environment GPT-to-network driver is further configured to read a master file table (MFT) of the partition using a UEFI block input/output (I/O) protocol, transmit the MFT to the remote information handling system, receive metadata relating to at least one file from the remote information handling system based on the MFT, read the at least one file from the storage resource based on the metadata, and transmit the at least one file to the remote information handling system.

8. The method of claim 7, further comprising decrypting the partition based on the authentication.

9. An article of manufacture comprising a non-transitory, computer-readable medium having computer-executable code thereon that is executable by a processor of an information handling system for, while the information handling system is in a pre-boot environment and prior to initialization of an operating system of the information handling system:
- a basic input/output system (BIOS) of the information handling system establishing a communication session with a remote information handling system; and
- executing a pre-boot environment GPT-to-network driver configured to detect one or more partitions of the storage resource, scan partition headers of the one or more partitions, and in response to authentication of the communication session, the BIOS transmitting data to the remote information handling system that is operable to expose a partition of a storage resource of the information handling system as raw partition data to the remote information handling system, wherein the remote information handling system is configured to mount a file system of the partition based on the raw partition data and create a backup copy of the file system;
- wherein the pre-boot environment GPT-to-network driver is further configured to read a master file table (MFT) of the partition using a UEFI block input/output (I/O) protocol, transmit the MFT to the remote information handling system, receive metadata relating to at least one file from the remote information handling system based on the MFT, read the at least one file from the storage resource based on the metadata, and transmit the at least one file to the remote information handling system.

10. The article of claim 9, wherein the partition is a Globally Unique Identifier Partition Table (GPT) partition.

11. The article of claim 9, wherein the partition is an NVMe namespace.

12. The article of claim 9, wherein the BIOS is a Unified Extensible Firmware Interface (UEFI) BIOS.

13. The article of claim 9, wherein the partition is of a type selected from the group consisting of NTFS, EXT3, and EXT4.

14. The article of claim 9, wherein the information handling system is configured to decrypt the partition based on the authentication.

* * * * *